Figure 1:
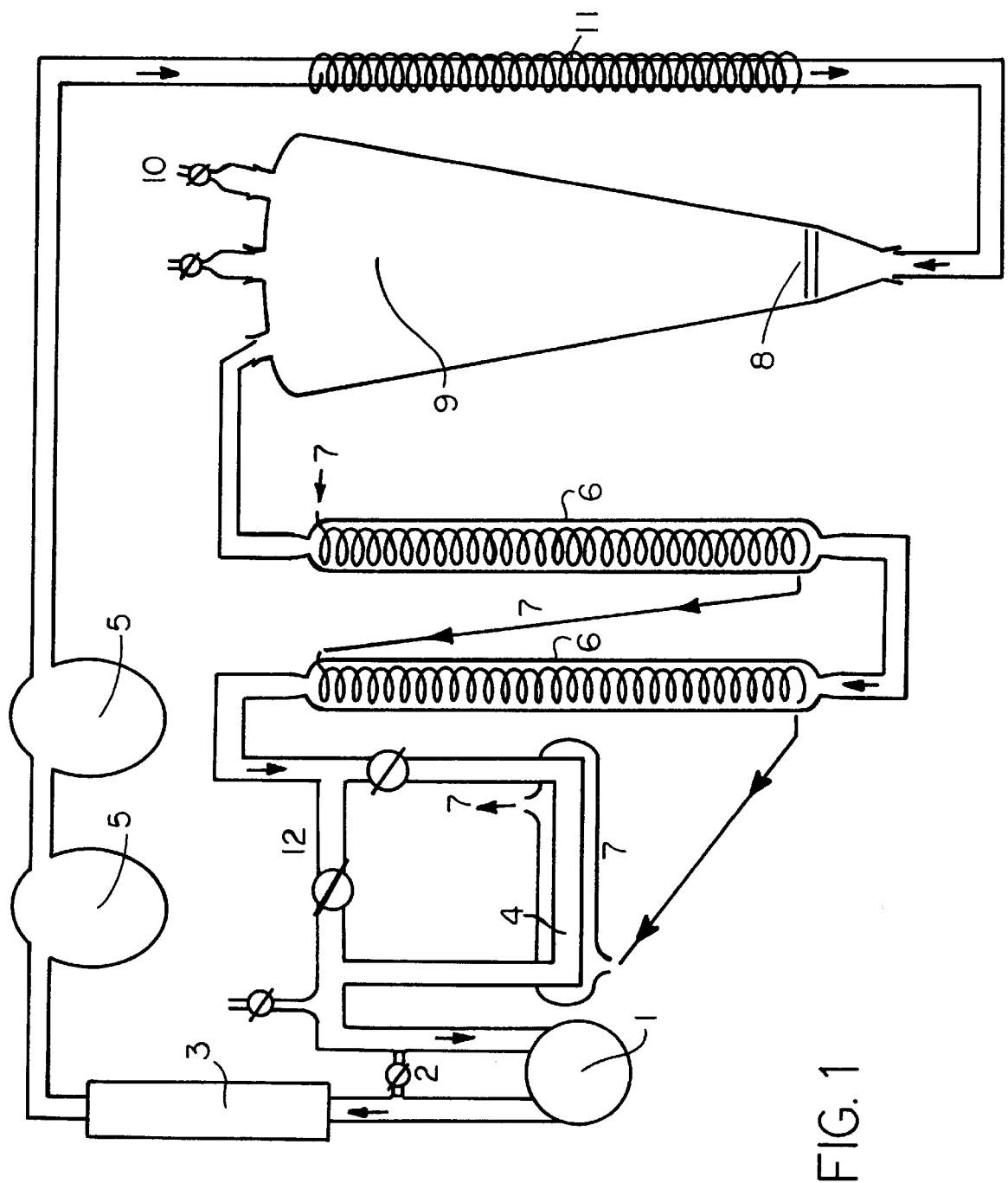

United States Patent
Von Thienen et al.

[11] Patent Number: 6,129,904
[45] Date of Patent: Oct. 10, 2000

[54] ALUMINUM OXIDE MASSES WITH VERY NARROW PORE RADIUS DISTRIBUTION

[75] Inventors: Norbert Von Thienen, Hamburg; Hansjörg Sinn, Norderstedt, both of Germany

[73] Assignee: Sud-Chemie A.G., Germany

[21] Appl. No.: 09/268,951

[22] Filed: Mar. 16, 1999

Related U.S. Application Data

[63] Continuation of application No. PCT/EP97/04934, Sep. 9, 1997.

[30] Foreign Application Priority Data

Sep. 19, 1996 [DE] Germany .................. 196 38 442

[51] Int. Cl.⁷ .................. C01F 7/02; B01J 29/06
[52] U.S. Cl. .................. 423/627; 423/625; 423/628; 502/64
[58] Field of Search .................. 423/625, 627, 423/628; 502/64

[56] References Cited

U.S. PATENT DOCUMENTS

| | | | |
|---|---|---|---|
| 4,061,724 | 12/1977 | Gross et al. | 423/335 |
| 4,073,865 | 2/1978 | Flanigen et al. | 423/339 |
| 4,104,294 | 8/1978 | Grose et al. | 260/448 |
| 4,228,036 | 10/1980 | Swift et al. | 252/437 |
| 4,389,385 | 6/1983 | Ramsay . | |
| 4,629,716 | 12/1986 | Kemp | 502/208 |
| 4,729,890 | 3/1988 | Stacey et al. | 423/628 |
| 5,281,328 | 1/1994 | Degnan, Jr. et al. | 208/111 |
| 5,622,684 | 4/1997 | Pinnavaia et al. . | |
| 5,837,639 | 11/1998 | Kresge et al. | 502/64 |
| 5,954,944 | 9/1999 | Zhang et al. | 208/89 |

FOREIGN PATENT DOCUMENTS

| | | |
|---|---|---|
| 0 110 490 | 6/1984 | European Pat. Off. . |
| 0 748 652 | 12/1996 | European Pat. Off. . |
| 4 035 089 | 4/1992 | Germany . |
| 1 629 248 | 2/1991 | U.S.S.R. . |
| WO93/17968 | 9/1993 | WIPO . |

OTHER PUBLICATIONS

Harlan, C. Jeff, et al. "tert–Butylaluminum Hydroxides and Oxides: Structural Relationship between Alkylalumoxanes and Alumina Gels", *Organometallics*, 13:2957–2969 (1994).

Vaudry, F. et al. "Synthesis of Pure Alumina Meso–porous Materials", *Chemistry of Materials*, vol. 8, No. 7, (Jul. 1996) pp. 1451–1464.

*Primary Examiner*—Tom Dunn
*Assistant Examiner*—Cynthia M Donley
*Attorney, Agent, or Firm*—Scott R. Cox

[57] ABSTRACT

An aluminum oxide mass characterized by a specific surface area greater than or equal to 70 m²/g and a narrow pore radius distribution, with at least 90% of the pore radii being approximately 0.5 to 2.5 nm, preferably approximately 1.7 to 2.2 nm.

7 Claims, 1 Drawing Sheet

ALUMINUM OXIDE MASSES WITH VERY NARROW PORE RADIUS DISTRIBUTION

This application is a continuation of PCT/EP97/04934, filed Sep. 9, 1997.

The invention concerns aluminum oxide masses with very narrow pore radius distribution which are particularly suited for production of catalysts and/or adsorption agents.

It is normally desirable that catalysts have a large surface. Since the surface can be increased only slowly and expensively by size reduction, an attempt is made to give a catalyst material a large "internal surface" by formation of very fine channels, so-called pores. The following relation applies to cylindrical pores:

Internal surface=2×pore volume/pore radius.

For pores having a radius of 4 nm and a pore volume of 1 $cm^3g^{-1}$, an internal surface of 1000 $m^2g^{-1}$. is obtained. Such materials are already commercially available.

However, the internal size is not the only thing that matters, but also that the walls of the catalyst pores have the correct appropriate structure. Wall structures of catalyst pores (acid, basic centers, openings, metal clusters, etc.) are considered the cause for active sites.

The pores of now common catalysts, except for the special case of zeolites, are not uniform in pore size and pore shape. Pores with more than 25 mm radius are referred to as macropores, pores with a radius from 1 to 25 nm are called mesopores. The pores with a radius smaller than 1 nm are the so-called micropores.

The macro- and mesopores are generally caused by the spacing between primary particles. The micropores are attributed to cracks with almost atomic dimensions within the primary particles. In the zeolites, which occur in nature, but can also be synthesized, cuboctahedral structures are present. Their structures are Si—O—Al structures. Their peculiarities consist of the fact that they surround relatively large cavities (cages) that are accessible via narrow openings in comparison. They have a very large internal surface in the form of their pores with fixed symmetry.

The underlying task of the invention was to prepare aluminum oxide masses or high specific surface and a narrow pore radius distribution.

The object of the invention are therefore aluminum oxide masses characterized by a specific surface of $\geq 70$ $m^2/g$ and a narrow pore radius distribution of $\geq 90\%$ between about 1.7 and 2.2 nm.

The specific surface is preferably $\geq 100$ $m^2/g$ and the pore radius distribution $\geq 95\%$ between about 1.8 and 2.1.

These masses can also contain limited fractions of aluminum oxocarbide structures related to production. They can also be doped with —Si—O— structures and/or catalytic reactive substances, especially with catalytically active metal.

The masses can be present in piece form so that they can be used for a fluidized bed process, optionally after further size reduction. Moreover, the masses can be bonded to at least one zeolite.

The aluminum-containing masses according to the invention can be produced by subjecting an aluminoxane with the structural base element —Al—O—Al— and/or an oligomeric structure based on Al—O—Al—O—Al—O—Al, in which the free bonds are occupied by organic residues, preferably alkyl residues, initially to mild hydrolysis and then thermolysis at temperatures in about 300 to 900° C.

Hydrolysis is preferably run in a fluidized bed, especially at temperatures of about 10 to 100° C.

One preferably starts from an aluminoxane in which the free bonds are occupied by lower alkyl groups, especially methyl groups.

One can start from an aluminoxane that was produced in higher hydrocarbons, like toluene or in polar compounds, like dioxane or diethyl ether.

One can also start from aluminoxanes that were doped with siloxane (silanols) and/or catalytically active substances, like metal.

When it is desirable to incorporate Si—O groups, the aluminoxanes are converted in known fashion with silanol before treatment according to the invention. If dopants, especially heavy metals, are desired, heavy metal compounds like acetylacetonates, can be added to the solutions or suspensions of aluminoxanes, during which these heavy metals are reduced and precipitate in the finest distribution in the aluminoxane.

To produce zeolite-containing masses conversion of aluminoxanes, optionally together with the dopants, can be run in the presence of at least one zeolite and the conversion product optionally subjected to size reduction in piece form.

Powdered zeolites can be stirred into the solution of aluminoxane. After treatment of the aluminoxane according to the invention the obtained masses contain the zeolites with unaltered activity. Since the mass produced according to the invention is in coarse pieces, this is of particular interest when very fine-grain zeolites are to be used in fluidized beds, which require specific particle size, since the coarse-piece material can be reduced as desired.

The aggregates have a bimodal pore structure, which is caused, on the one hand, by the pores structure of the aluminum oxide masses and, on the other hand, by the pore structure of the zeolite. It was possible in this fashion to influence the selectivity of catalysts or adsorption agents produced from the masses.

The object of the invention is also the use of the aforementioned masses to produce catalysts and/or absorption agents.

The aluminoxanes used according to the invention were investigated in the course of research work on Ziegler-Natta catalysts. The basic structural element is an Al—O—Al structure. Oligomeric Al—O—Al—O—Al—O—Al structural elements are also present to a significant extent, in which the free bonds of Al in the alumioxane are occupied by organic groups, especially alkyl groups. In special cases, especially in methylaluminoxane, cuboctahedral structures are also formed with a composition $[Al_{16}O_{12}(CH_3)_{24}]\times 2Al$ $(CH_3)_3$, which can be understood based on coordinative saturation of a base unit. For this purpose the literature source "Macromolecular Symposia Aluminoxanes", Macromol. Symp., Vol. 97; especially A. R. Barron, pages 15–25; H. Sinn, pages 27–52 is referred to.

It was initially investigated whether large internal surfaces can be formed during elimination of the alkyl groups by hydrolysis or thernolysis. During hydrolysis with larger amounts of water vapor or liquid water, however, the —Al—O—Al—O—Al— structures were destroyed with formation of aluminum hydroxide, in which aluminum oxides with a larger surface but with a very broad pore radius distribution were obtained. Mild hydrolysis with limited amounts of water vapor led to products of a low surface and a broad pore radius distribution. If thermolysis was used instead of hydrolysis, then aluminum oxocarbides were obtained with a limited specific surface and a broad pore radius distribution.

Only with the combination according to the invention of mild hydrolysis and thermolysis could masses with the stated high internal specific surface and narrow pore radius distribution be obtained. Mild hydrolysis is preferably run in a fluidized bed, in which the aluminoxane is preferably fluidized with nitrogen or argon, in which very small amounts of gaseous water are added to the inert gas with the stipulation that the dew point limit is always fallen short of. This will be achieved, for example, if the fluidizing gas absorbed water vapor over cooled ice at low temperature (water vapor partial pressure about 0.5 to 5 mbar) and then was brought to higher temperature before contact with the fluidized product during hydrolysis (about 0 to 100° C., preferably about 20° C. above the saturation temperature).

The pore radius distribution of the obtained products primarily (>95%) lies between about 1.8 and 2.1 nm. The obtained aluminum oxide masses therefore have pore radii that are much higher than those of zeolites, which generally lie between 0.3 and 1 nm.

The surface determinations occurred according to BET on a Sorptomatic 1900 from Carlo Erba. Evaluation occurred according to BET in the Mileston 100 program. Nitrogen at −195.82° C. and a working pressure of 800 torr served as measurement gas. Adsorption occurred up to about 780 torr, desorption was recorded by the final pressure of adsorption up to about 30 torr. The pore radius distribution could also be interpreted from the obtained curves.

The invention is explained by the following examples in which examples 1 to 6 explain preparation of the aluminoxane and examples 7 and 8 explain the preparation of the aluminum oxide masses according to the invention by hydrolysis and thermolysis.

EXAMPLE 1

Preparation of Methylaluminoxane from Toluene

Commercial methylaluminoxane can be used. In the present case aluminoxane prepared by passing a solution of trimethylaluminum in toluene at −40° C. over an ice surface cooled to −40° C. (cf., Sinn, Bliemeister, Tikwe, Clausnitzer, Winter and Zarnke, "Some new results on methylalumoxanes" in W. Kaminsky, H. Sinn (editors), "Olefin polymerization", Springer-Verlag, 1988, pp. 257 ff). The solvent was distilled off in vacuum, the residues condensed at $10^{-4}$ mbar. The glassy or powdered materials after crushing were subjected according to example 7 for hydrolysis and according to example 8 to pyrolysis or hydrolysis with subsequent pyrolysis.

EXAMPLE 2

Preparation of Methylalumioxane from Dioxane

Water in small batches was added to a solution of trimethylaluminoxane (TMA) in dioxane during cooling at room temperature; the next addition occurred after gas liberation ceased; addition was continued until 1 mol of methane was evolved per mol of TMA. The solvent was distilled off in vacuum, the residues condensed at $10^{-4}$ mbar. The glassy or powdered material after crushing was subjected according to example 7 to hydrolysis and according to example 8 to pyrolysis or to hydrolysis with subsequent pyrolysis.

EXAMPLE 3

Preparation of Aluminoxane from TMA Diethyl Etherate in Toluene

Similar to example 1 a solution of TMA diethyl etherate in toluene was converted at −30° C. on an ice surface. After discharge of the solution from the reactor it contained Al—OH groups were trapped by dropwise addition of an excess of TMA during cooling at −20 to −10° C. The solvent as well as excess TMA metals were then removed in vacuum. The oily products were converted to a glassy solid by several weeks of drying in high vacuum ($10^{-6}$ mbar). This solid was a starting material for treatment according to the invention.

EXAMPLE 4

Doping of Methylaluminoxane with Triethylsilanol

Triethylsilanol was added to a solution of methylaluminoxane with a methyl/aluminum ratio of 1.65 under ice cooling. All the silanol is consumed until an Al/Si ratio is reached and therefore a maximum of ⅔ of the methyl groups of the aluminoxane was substituted with Si—O groups. Depending on the added amount of silanol, the product is more or less rich in methyl groups, which can be subjected to hydrolysis.

EXAMPLE 5

Doping of Methylaluminoxane with Heavy Metal Compounds

A solution of 3.5 iron(III) acetylacetonate was added dropwise at −78° C. to a solution of 25 g methylaluminoxane. After 24 hours of standing at room temperature it was filtered. After vacuum drying a product with an aluminum/iron ratio of about 7 and a methyl/aluminum ratio of 1.50 it was obtained from the filter residue. After distillation of the solvent in vacuum and subsequent vacuum drying the filtrate yielded a product with an aluminum/iron ratio of about 1.60 and a methyl/aluminum ratio of 1.55. Materials of this type served as educts for further treatment according to examples 7 and 8.

EXAMPLE 6

Conversion of Methylaluminoxane from Toluene with Zeolite

The methylaluminoxane was dissolved from preparation in double the amount of toluene. The zeolite H-ZSM-5 dried beforehand at 250° C. in vacuum was then added in the desired amount (for example in an aluminoxane:zeolite ratio of 1:2), during which methane was developed. The mixture was then allowed to stand overnight during agitation. After subsequent careful distillation of the solvent in vacuum a gray solid was obtained that was fed to further conversion.

EXAMPLE 7

Mild Hydrolysis of Aluminoxanes (comparison)

Hydrolysis occurred in the apparatus sketched in the accompanying FIGURE. Gas circulation occurs by means of a diaphragm pump 1. The gas velocity is controlled by bypass 2, which is measured by means of a rotameter 3. The gas is moistened in the water (ice) supply 4. Pressure surge equalization vessel 5 serves to smooth the gas flow. Cooler 6 serves for gas tempering. The cooling loop is designated 7. Fluidization of the aluminoxane occurs in a fluidized bed reactor 9 equipped with a frit 8 as gas distributor, which is provided with a discharge 10 to a gas meter. The gas is heated with a heating coil 11. The incipient fluidization point is set by means of a bypass 12. The aluminoxane is initially fluidized in reactor 9 with an absolute dry argon. After adjustment of a reasonable fluidization state (about double gas velocity after the beginning of fluidization (incipient fluidization point)) the bypass 12 is closed and the fluidizing gas loaded by passing over the cooled (−20° C.) ice surface 4 corresponding to the very low water vapor pressure (about 0.5 mbar) over ice and fed back to the fluidized bed after heating to 10° C. Fluidization is continued until methane evolution (volume of pressure increase) no longer occurs.

EXAMPLE 8

Pyrolysis of Aluminoxane (comparison) or Hydrolysis Products (according to the invention)

The educt being pyrolyzed is transferred under argon as protective gas into a quartz tube and heated within 1.5 hours to 400° C. and within another 2 hours to 850° C. Any liquid condensates formed are trapped in a downline dead end tube cooled to room temperature and the pyrolysis gases taken off. The final temperature is maintained for about 24 hours and the tubes are then allowed to cool at room temperature.

The results are shown in the following table.

TABLE
Aluminoxane according to example 1:

|  | Surface ($m^2$/g) | Pore radius (nm, [%]) |
| --- | --- | --- |
| Pyrolysis 400° C. | 10 | <2 [50], 2–6 [30], 6–15 [15] |
| Pyrolysis 850° C. | 7 | <3 [80], 3–6 [18] |
| Hydrolysis | 10 | <2.5 [80], 2, 5–10 [17] |
| Hydrolysis + pyrolysis 400° C. | 200 | 0.5–2.5 [95] |
| Hydrolysis + pyrolysis 850° C. | 70 | 1.7–2.2 [>95] |

Aluminoxane according to example 2:

|  | Surface ($m^2$/g) | Pore radius (nm, %) |
| --- | --- | --- |
| Pyrolysis 400° C. | 85 | <0.5 [25], 0.5–2.5 [67] |
| Pyrolysis 850° C. | 9.7 | 0.5–4.0 [80] |
| Hydrolysis | 9.6 | 0.5–5 [85] |
| Hydrolysis + pyrolysis 400° C. | 184 | 1.9–2.1 [>99] |

Aluminoxane according to example 3:

|  | Surface ($m^2$/g) | Pore radius (nm, %) |
| --- | --- | --- |
| Pyrolysis 400° C. | 12 | 0.5–3 [50], 3–12 [40] |
| Pyrolysis 850° C. | 59 | 0.5–3 [55], 3–12 [38] |
| Hydrolysis | 10 | <3.0 [60], 3–6 [36] |
| Hydrolysis + pyrolysis 400° C. | 250 | 1.9–2.1 [>95] |
| Hydrolysis + pyrolysis 850° C. | 120 | 2.0–2.2 [>95] |

The table shows that not only a very high specific surface is produced by hydrolysis and thermolysis, but the pore radius distribution is also kept within narrow limits. The table also shows that the process is not limited to methylaluminoxane produced in toluene, but aluminoxanes produced in the presence of diethyl ether or dioxane can also acquire a large internal surface and unusually narrow pore radius distribution.

What is claimed is:

1. An aluminum oxide composition formed from an aluminoxane, wherein the composition has a specific surface area equal to or greater than about 70 $m^2$/g and a narrow pore radii distribution where at least about 90 percent of the pore radii are between about 1.7 and 2.2 nm.

2. The composition of claim 1 wherein the specific surface area of the composition is equal to or greater than about 100 $m^2$/g, and about 95 percent or more of the pore radii are between 1.8 and 2.1 nm.

3. The composition of claim 1 further comprising aluminum oxocarbide structures.

4. The composition of claim 1 wherein the composition is doped with a material selected from the group consisting of Si—O structures and catalytically active substances.

5. The composition of claim 1 wherein the composition is doped with Si—O structures and catalytically active substances.

6. The composition of claim 4 wherein the catalytically active substance is a catalytically active metal.

7. The composition of claim 1 further comprising a zeolite product.

* * * * *